United States Patent
Oh et al.

(10) Patent No.: US 9,194,305 B2
(45) Date of Patent: Nov. 24, 2015

(54) ENGINE HAVING CONTINUOUS VARIABLE TIMING DEVICE

(71) Applicants: Hyundai Motor Company, Seoul (KR); Kia Motors Corporation, Seoul (KR)

(72) Inventors: Young Kyu Oh, Whasung-Si (KR); Chulho Yu, Whasung-Si (KR); Jin Hong Kim, Whasung-Si (KR); Il Joong Hwang, Whasung-Si (KR); Jinnam Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 46 days.

(21) Appl. No.: 14/145,295

(22) Filed: Dec. 31, 2013

(65) Prior Publication Data

US 2015/0101553 A1 Apr. 16, 2015

(30) Foreign Application Priority Data

Oct. 14, 2013 (KR) .................. 10-2013-0122233

(51) Int. Cl.
  *F01L 1/34* (2006.01)
  *F02D 13/02* (2006.01)
  *F02P 5/14* (2006.01)
  *F02P 5/15* (2006.01)
  *F02D 41/00* (2006.01)

(52) U.S. Cl.
  CPC ......... *F02D 13/0238* (2013.01); *F02D 41/0002* (2013.01); *F02P 5/14* (2013.01); *F02P 5/1516* (2013.01); *F01L 1/34* (2013.01); *F02D 2041/001* (2013.01)

(58) Field of Classification Search
  CPC .... F01L 1/34; F02D 13/0238; F02D 41/0002; F02D 2041/001
  USPC ............................................ 123/90.15, 90.17
  See application file for complete search history.

(56) References Cited

U.S. PATENT DOCUMENTS

| 8,365,528 | B2 * | 2/2013 | Leone et al. ............... 60/605.1 |
| 8,904,993 | B2 * | 12/2014 | Santoso et al. ............... 123/295 |
| 2010/0170460 | A1 * | 7/2010 | Leone et al. |
| 2010/0313845 | A1 * | 12/2010 | Santoso et al. |

FOREIGN PATENT DOCUMENTS

| JP | 5-340290 A | 12/1993 |
| JP | 7-77073 A | 3/1995 |
| JP | 2002-276520 A | 9/2002 |
| KR | 10-2013-0002029 A | 1/2013 |
| KR | 10-2013-0032669 A | 4/2013 |

* cited by examiner

*Primary Examiner* — Ching Chang
(74) *Attorney, Agent, or Firm* — Morgan, Lewis & Bockius LLP

(57) ABSTRACT

A control method of an engine having a variable valve timing may include selecting one of a first mode and a second mode as a driving mode, retarding an intake cam to a first predetermined angle range in the first mode, and advancing an intake cam to a second predetermined angle range in the second mode.

7 Claims, 4 Drawing Sheets

ENGINE HAVING CONTINUOUS VARIABLE TIMING DEVICE

CROSS-REFERENCE TO RELATED APPLICATION

The present application claims priority to Korean Patent Application No. 10-2013-0122233 filed on Oct. 14, 2013, the entire contents of which is incorporated herein for all purposes by this reference.

BACKGROUND OF THE INVENTION

1. Field of the Invention

The present invention is related to an engine having a continuous valve timing device that advances or retards a camshaft moving an intake valve or an exhaust valve so as to minimize a compression loss and to reduce fuel consumption.

2. Description of Related Art

A continuously variable valve timing (CVVT) device has been introduced advances or retards a rotational phase of a camshaft depending on an engine speed and a load so as to improve engine performance, reduce fuel consumption, and improve exhaust gas quality.

Meanwhile, researches has been being undertaken so as to reduce fuel consumption in a lower load condition and increase engine output in a high load condition such that the various driving demand is satisfied.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method of an engine having a variable valve timing device having advantages of reducing fuel consumption in a low load condition and increasing engine output in a high load condition so as to satisfy various driving demands.

In an aspect of the present invention, a control method of an engine having a variable valve timing, may include selecting one of a first mode and a second mode as a driving mode, retarding an intake cam to a first predetermined angle range in the first mode, and advancing an intake cam to a second predetermined angle range in the second mode.

In the retarding of the intake cam to the first predetermined angle range, an ignition timing of combustion gas of a cylinder is advanced.

In the retarding of the intake cam to the first predetermined angle range, the first predetermined angle range is a predetermined value.

In the advancing of the intake cam to the second predetermined angle range, the second predetermined angle range is a predetermined value.

In the advancing of the intake cam to the second predetermined angle range, an overlap section that an intake valve and an exhaust valve are simultaneously opened is controlled to be increased.

In the advancing of the intake cam to the second predetermined angle range, a pumping loss is controlled to be reduced when a piston compresses intake air.

One of the first mode and the second mode is selected by a driver.

In a control method of an engine having a variable valve timing device according to the present invention so as to achieve the above object, an opening timing of an intake valve is retarded in a low load condition such that pumping loss is reduced and fuel consumption is reduced, and an opening timing of an intake valve is advanced in a high load condition such that intake air amount is increased and output and torque are increased.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
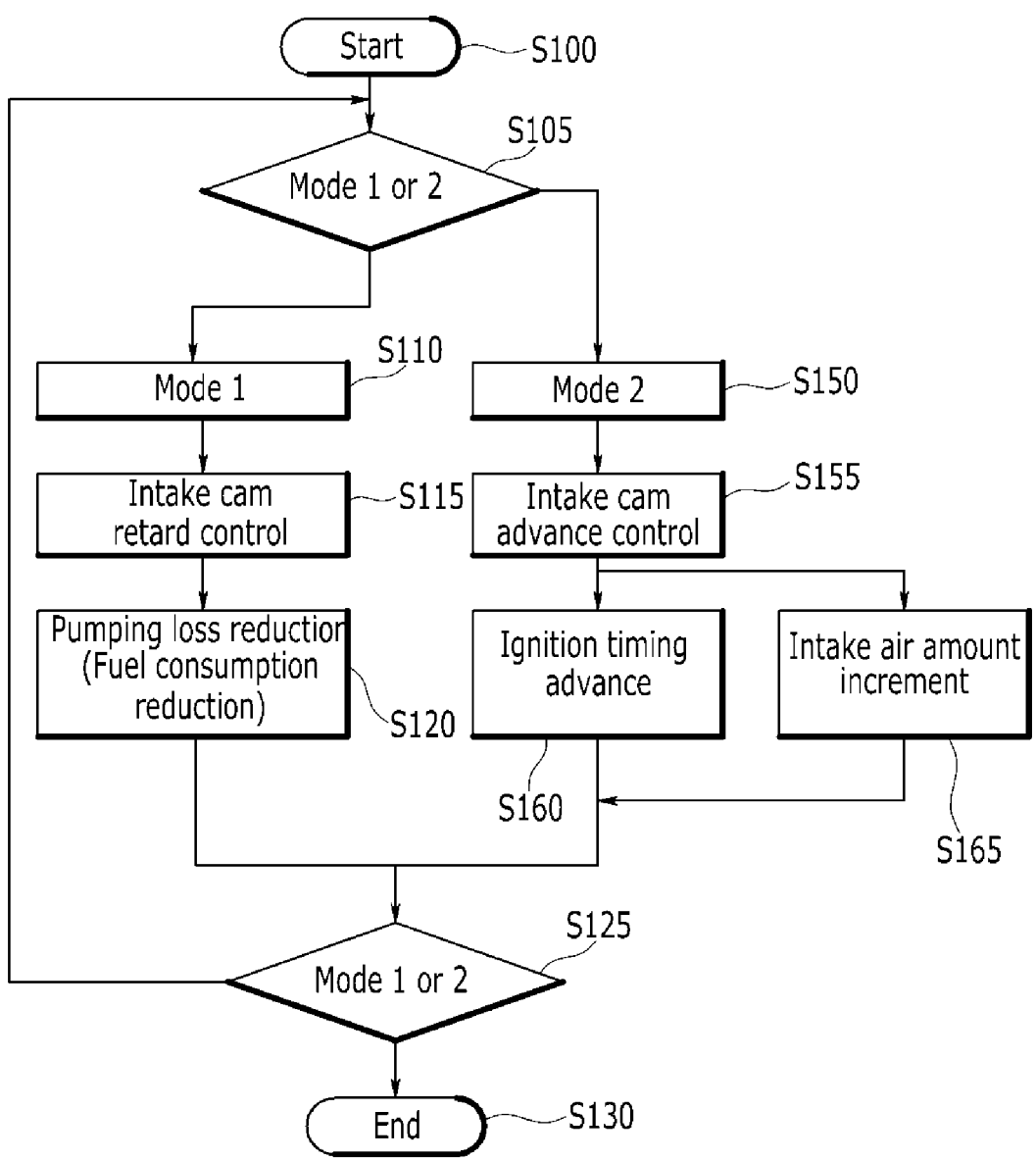
FIG. 1 is a flowchart showing a method for controlling a continuously variable valve timing device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

An engine that the present invention is applied is a gasoline or a diesel internal combustion engine that can be applied to a MPI (multi point injection), a GDI (gasoline direct injection), a TGDI (turbo gasoline direct injection), a CDA (cylinder deactivation), or a TGDI (turbo gasoline direct injection)+CDA (cylinder deactivation).

And, an intake cam is optimally controlled to be advanced or retarded in accordance with a speed and a load of an engine and an ackison cycle and LIVC (late intake valve closing) reduces a pumping loss such that a real compression ratio is increased, fuel consumption is reduced, and a THC (total hydro carbon) are reduced.

Further, compared with a conventional DCVVT (double continuously variable valve timing), advance or retard of a valve lift is quickly controlled in accordance with a mode transformation, fuel consumption is reduced, and torque is increased.

Accordingly, so as to improve an initial starting ability and change operating timing of the intake cam 160, a middle phase continuously variable valve timing (CVVT) device having a mechanical locking device is applied in the in an exemplary embodiment of the present invention.

A middle phase stop continuously variable valve timing (CVVT) device is started in a middle position, and a timing of a valve is advanced or retarded depending on the driving condition of the engine. And, in a middle phase stop continuously variable valve timing (CVVT), a locking method is used to change a valve of an intake to a middle position between an advance and a retard condition when an engine is stopped.

Figure 4:
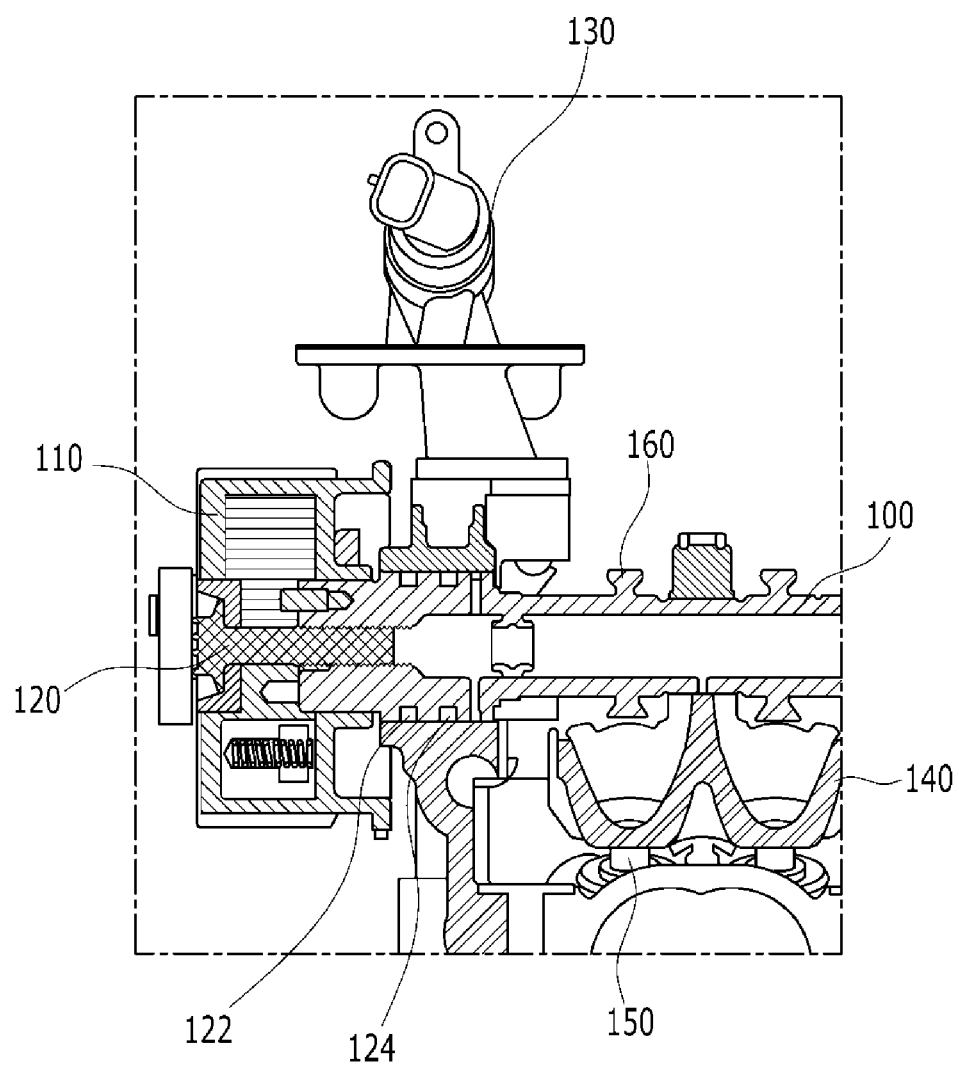
FIG. 4 is a schematic cross-sectional view showing an exemplary embodiment of a continuously variable valve timing device.

FIG. 4 is a schematic cross-sectional view showing an exemplary embodiment of a continuously variable valve timing device.

Referring to FIG. 4, an engine includes a cylinder head 140, a camshaft 100, a variable rotation portion 110, an oil control valve (130, OCV), a variable valve bolt 120, an intake valve 150, and an intake cam 160, wherein an advance oil passage 122 and a retard oil passage 124 are formed at one side of the camshaft 100.

The variable rotation portion 110 is a pulley or a sprocket and is fixed on one end of the camshaft 100 through the variable valve bolt 120.

The variable rotation portion 110 is rotated by an engine through a crankshaft, a chain, or a belt to rotate the camshaft 100. And, the intake cam 160 that is formed on the camshaft 100 lifts the intake valve 150.

And, a retard angle chamber is formed to be connected to the retard oil passage 124 and an advance angle chamber is formed to be connected to the advance oil passage 122 in the variable rotation portion 110.

If hydraulic pressure is supplied to the retard angle chamber by the oil control valve 130, the variable rotation portion 110 is relatively rotated in a normal direction such that the camshaft 100 is retarded, and if hydraulic pressure is supplied to the advance angle chamber, the variable rotation portion 110 is relatively rotated in a reverse direction such that the camshaft 100 is advanced.

Further, the oil control valve 130 is necessary to control oil that is supplied to the variable rotation portion 110, and a solenoid valve as a control element is necessary to control the oil control valve 130.

FIG. 1 is a flowchart showing a method for controlling a continuously variable valve timing device according to an exemplary embodiment of the present invention.

Referring to FIG. 1, a control starts in a S100, and it is determined whether a driving mode is in a first mode or in a second mode in a S105. If it is determined that the driving mode is in a first mode, a S110 is performed, and if it is determined that the driving mode is in a second mode, a S150 is performed.

A first mode is selected in a S110, and a control is performed to retard the intake cam 160 that lifts the intake valve 150 in a S115. The angle that the intake cam 160 is retarded is set depending on a driving condition and the angle can be variably controlled within a predetermined angle range.

A pumping loss of a piston and fuel consumption is reduced through a retard control of the intake cam 160 in a S120.

Further, a second mode is selected in a S150 and a control is performed to advance the intake cam 160 that lifts the intake valve 150 in a S155. The angle that the intake cam 160 is advanced is set depending on a driving condition and the angle can be controlled within a predetermined angle range.

And, ignition timing for igniting mixture gas of combustion chamber is respectively advanced in S160 and 165, and mixture gas is increased by opening and closing of an intake valve and an exhaust valve such that output and torque are increased.

And, a driving mode is selected in S125, and if the driving mode is changed, a S105 is performed, and if the driving mode is not changed, the control is ended in S130.

Figure 2:
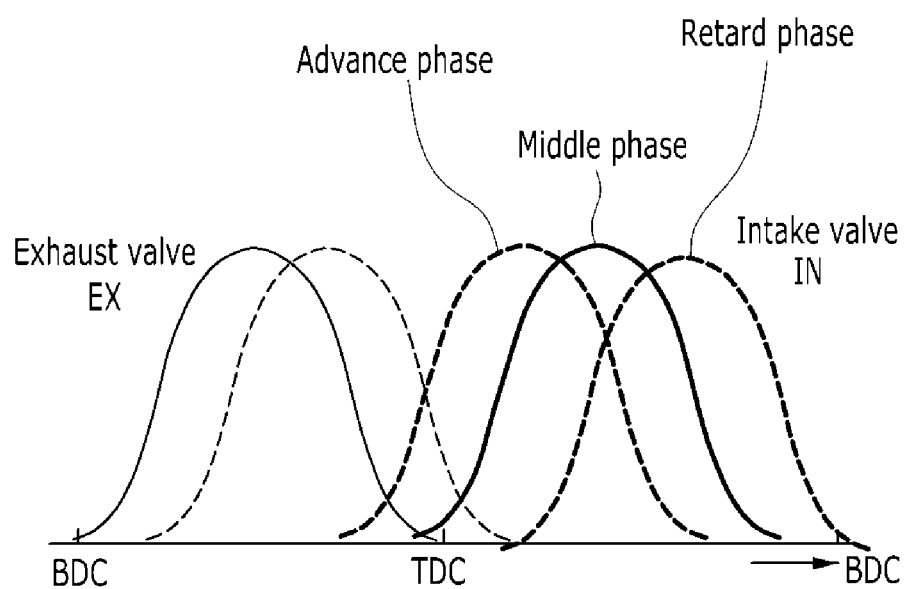
FIG. 2 is a graph showing a condition that a valve lift is retarded and advanced in a continuously variable valve timing device according to an exemplary embodiment of the present invention.

FIG. 2 is a graph showing a condition that a valve lift is retarded and advanced in a continuously variable valve timing device according to an exemplary embodiment of the present invention.

Referring to FIG. 2, a horizontal axis denotes a rotational position of a crankshaft, and a vertical axis denotes a lift amount of an exhaust valve and an intake valve 150.

BDC is an abbreviated from of Bottom dead center, this signifies that a piston that is connected to a crankshaft is positioned on a bottom dead center, and TDC is an abbreviated form of Top dead center, this signifies that a piston that is connected to a crankshaft is positioned on a top dead center.

As shown in the drawings, intake valve 150 is advanced or retarded from a middle position phase that is formed between an advanced position and a retard position such that an overlap section with an exhaust valve is varied to reduce pumping loss, air amount of combustion chamber is increased, and torque and output are improved.

Figure 3:
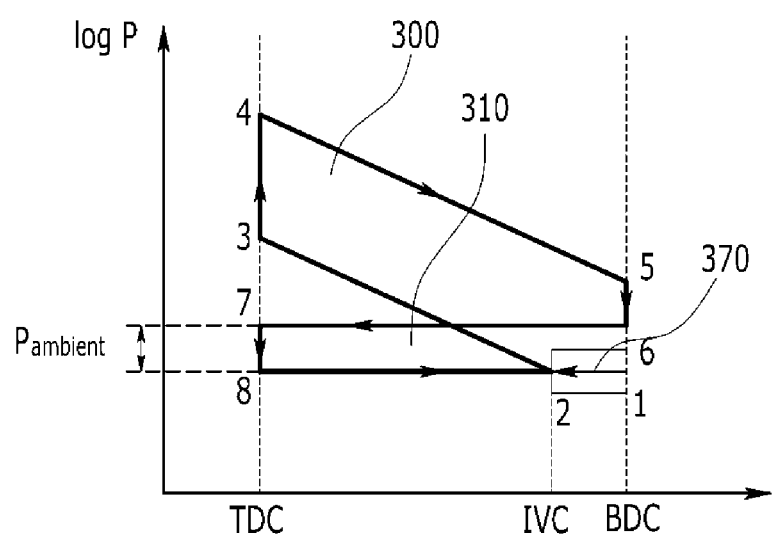
FIG. 3 is a graph showing an effect that reduces a pumping loss through a continuously variable valve timing device according to an exemplary embodiment of the present invention.

FIG. 3 is a graph showing an effect that reduces a pumping loss through a continuously variable valve timing device according to an exemplary embodiment of the present invention.

Referring to FIG. 3, a horizontal axis shows a rotational position of a crankshaft, and a vertical axis shows a pressure.

IVC is an abbreviated form of Inlet Valve Closing and denotes a closing timing of an intake valve 150. As shown in the drawings, because the IVC is retarded, pumping loss 310 is reduced and fuel consumption is reduced. Here, explosion energy 300 is not changed. Further, as the retard area 370 is increased, the pumping loss 310 can be reduced.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A control method of an engine having a variable valve timing, comprising:
   starting the engine with an intake cam positioned at a middle position between an advance condition and a retard condition;
   selecting one of a first mode and a second mode as a driving mode;
   retarding the intake cam to a first predetermined angle range in the first mode;
   advancing the intake cam to a second predetermined angle range in the second mode; and
   positioning the intake cam at the middle position when the engine is stopped.

2. The control method of the engine having the variable valve timing of claim 1, wherein in the retarding of the intake cam to the first predetermined angle range, an ignition timing of combustion gas of a cylinder is advanced.

3. The control method of the engine having the variable valve timing of claim 1, wherein in the retarding of the intake cam to the first predetermined angle range, the first predetermined angle range is a predetermined value.

4. The control method of the engine having the variable valve timing of claim 1, wherein in the advancing of the intake cam to the second predetermined angle range, the second predetermined angle range is a predetermined value.

5. The control method of the engine having the variable valve timing of claim 1, wherein in the advancing of the intake cam to the second predetermined angle range, an overlap section that an intake valve and an exhaust valve are simultaneously opened is controlled to be increased.

6. The control method of the engine having the variable valve timing of claim 1, wherein in the advancing of the intake cam to the second predetermined angle range, a pumping loss is controlled to be reduced when a piston compresses intake air.

7. The control method of the engine having the variable valve timing of claim 1, wherein one of the first mode and the second mode is selected by a driver.

* * * * *